UNITED STATES PATENT OFFICE.

MAXIMILIAN TOCH, OF NEW YORK, N. Y., ASSIGNOR OF ONE-HALF TO HENRY M. TOCH, OF NEW YORK, N. Y.

METHOD OF TREATING CEMENT AND CEMENT CONSTRUCTION.

No. 813,841.  Specification of Letters Patent.  Patented Feb. 27, 1906.

Application filed October 18, 1905. Serial No. 283,326.

*To all whom it may concern:*

Be it known that I, MAXIMILIAN TOCH, a citizen of the United States, residing at New York, in the county of New York and State of New York, have invented certain new and useful Improvements in Methods of Treating Cement and Cement Construction, of which the following is a specification.

This invention is a method of treating cement constructions to render them oil and water proof, and a cement construction prepared in accordance with the method.

The method consists in treating such cement constructions as floors, walls, &c., with a suitable organic acid or acid body or with a mixture containing one or more of such compounds. A second-coating mixture similar in its general nature to the first, but containing also a suitable pigment, is preferably afterward applied.

Ordinary cement constructions, and more particularly cement floors, soon undergo in use a superficial disintegration, yielding a fine dust, which is highly injurious to delicate machinery, and particularly to electrical installations. I have discovered that such surface disintegration can be prevented by treating the cement with certain organic acids or acid bodies, my preferred procedure being as follows: I first apply to the cement floor, wall, or other construction a filler prepared from a highly-acid resin, such as Manila or copal gum. For the preparation of the filler the resin is heated, together with a suitable vegetable drying-oil or mixture of oils—as, for instance, linseed and chinawood oils—under conditions which will substantially avoid the loss of volatile resin acids. This heating is preferably effected *in vacuo*, although the method technically known as "underheating" may be used. The heating is continued until solution is effected, after which a suitable diluent, as benzol, acetone, turpentine, or naphtha, is added. One or more coats of this filler may be applied to the cement. For the preparation of the second-coating mixture the resin is heated under such conditions as to expel a portion of the volatile resin acids, and an increased proportion of vegetable drying-oil is used. The solution is diluted as above and is preferably mixed with a suitable pigment, as oxid of iron or zinc or sulfid of zinc in proper proportion to give the desired shade. The mixture so prepared will dry in about five hours to a hard and durable coating, in which no surface disintegration will occur, even after a long period of use.

The surface disintegration or powdering cement is presumably due to incomplete surface setting and likewise to a liberation of calcium oxid or hydroxid in the final setting. The acid filler above described reacts with the calcium compounds in the outer portion of the cement construction to form a hard resinate or other organic calcium salt, which serves as an efficient protective layer, and which is reinforced by the second or exterior coating. The completed construction is both oil and water proof and is highly resistant to abrasion and deterioration.

I claim—

1. The method of treating Portland-cement constructions which consists in applying to the surface of the cement a suitable organic acid or acid body, substantially as described.

2. The method of treating Portland-cement constructions which consists in applying to the surface of the cement a solution containing an acid resin, substantially as described.

3. The method of treating Portland-cement constructions which consists in applying to the surface of the cement a solution containing an acid resin and the vegetable drying-oil, substantially as described.

4. The method of treating Portland-cement constructions which consists in applying to the surface of the cement a solution containing an acid resin, a vegetable drying-oil and a diluent, substantially as described.

5. The method of treating Portland-cement constructions which consists in applying to the surface of the cement a suitable organic acid or acid body, and then applying a mixture containing a pigment, substantially as described.

6. The method of treating Portland-cement constructions which consists in applying to the surface of the cement a suitable organic acid or acid body, and then applying a mixture containing a dissolved resin and a pigment.

7. The method of treating Portland-cement constructions which consists in applying to the surface of the cement a solution containing an acid resin, a vegetable drying-oil and a diluent, and then applying a mixture containing a dissolved resin and a pigment, substantially as described.

8. An oil and water proof Portland-cement construction superficially treated with an organic acid or acid body, substantially as described.

9. An oil and water proof Portland-cement construction containing a compound of a resin acid, substantially as described.

10. An oil and water proof Portland-cement construction having a surface layer containing a compound of a resin acid, substantially as described.

11. An oil and water proof Portland-cement construction having a surface layer containing calcium resinate, substantially as described.

In testimony whereof I affix my signature in presence of two witnesses.

MAXIMILIAN TOCH.

Witnesses:
 H. E. BAER,
 HARRY M. TOCH.

DISCLAIMER.

813,841.—*Maximilian Toch*, New York, N. Y. METHOD OF TREATING CEMENT AND CEMENT CONSTRUCTION. Patent dated February 27, 1906. Disclaimer filed July 31, 1916, by the inventor and assignee, *Henry M. Toch*.

Enter their disclaimer as to said Letters Patent No. 813,841—

"of any method, product, or construction excepting where a mixture containing Manila or other copal gum, or chinawood oil, is employed."

[*Official Gazette, August 8, 1916.*]

oil and a diluent, and then applying a mixture containing a dissolved resin and a pigment, substantially as described.

8. An oil and water proof Portland-cement construction superficially treated with an organic acid or acid body, substantially as described.

9. An oil and water proof Portland-cement construction containing a compound of a resin acid, substantially as described.

10. An oil and water proof Portland-cement construction having a surface layer containing a compound of a resin acid, substantially as described.

11. An oil and water proof Portland-cement construction having a surface layer containing calcium resinate, substantially as described.

In testimony whereof I affix my signature in presence of two witnesses.

MAXIMILIAN TOCH.

Witnesses:
H. E. BAER,
HARRY M. TOCH.

DISCLAIMER.

813,841.—*Maximilian Toch*, New York, N. Y. METHOD OF TREATING CEMENT AND CEMENT CONSTRUCTION. Patent dated February 27, 1906. Disclaimer filed July 31, 1916, by the inventor and assignee, *Henry M. Toch*.

Enter their disclaimer as to said Letters Patent No. 813,841—

"of any method, product, or construction excepting where a mixture containing Manila or other copal gum, or chinawood oil, is employed."

[*Official Gazette, August 8, 1916.*]

DISCLAIMER.

813,841.—*Maximilian Toch,* New York, N. Y. METHOD OF TREATING CEMENT AND CEMENT CONSTRUCTION. Patent dated February 27, 1906. Disclaimer filed July 31, 1916, by the inventor and assignee, *Henry M. Toch.*

Enter their disclaimer as to said Letters Patent No. 813,841—

"of any method, product, or construction excepting where a mixture containing Manila or other copal gum, or chinawood oil, is employed."

[*Official Gazette, August 8, 1916.*]